Sept. 17, 1929. J. F. GOSHORN 1,728,560
SNAP FOR FISHING TACKLE
Filed Nov. 30, 1928
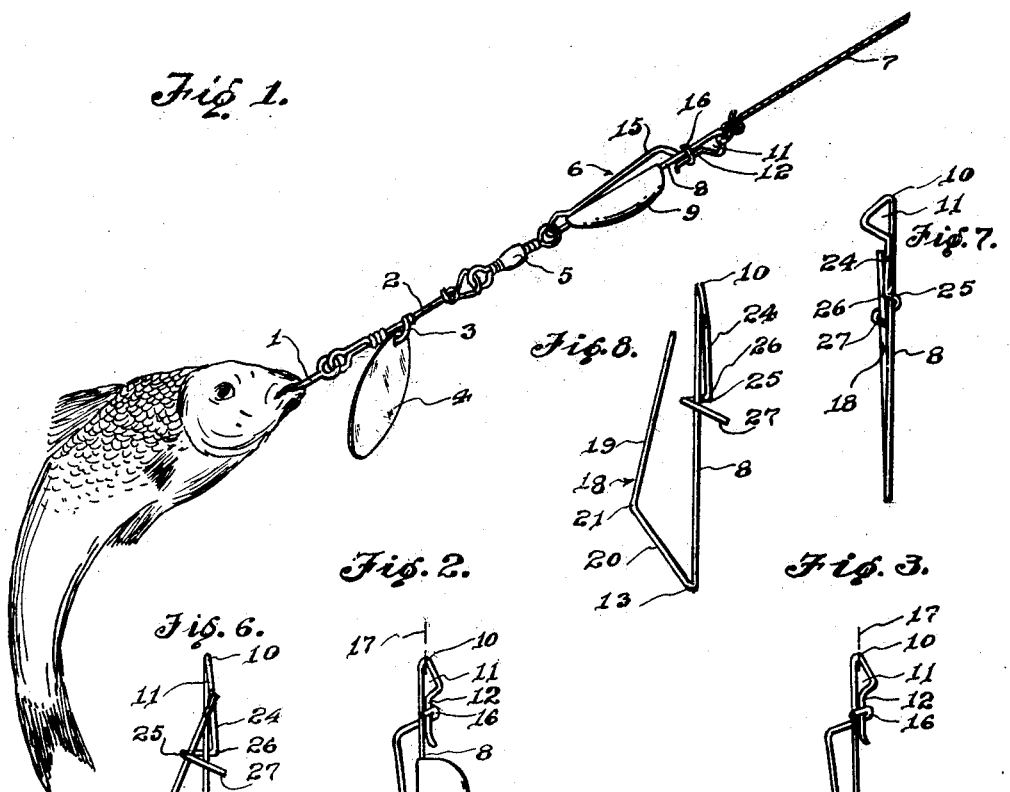
INVENTOR.
J. F. Goshorn
BY
J. Kaplan
ATTORNEY.

Patented Sept. 17, 1929

1,728,560

UNITED STATES PATENT OFFICE

JOHN F. GOSHORN, OF KANSAS CITY, MISSOURI

SNAP FOR FISHING TACKLE

Application filed November 30, 1928. Serial No. 322,800.

This invention relates to fishing tackle and more particularly to the snap for connecting the tackle to the line.

The principal object of the invention is to provide a snap for fishing tackle made from a single strand of resilient wire which will transmit the pull to the main shaft and so arranged that the hook will tighten in proportion to the weight or pull on the bait end on the line.

Another object of the invention is to provide a device of this character which is simple in construction, can be readily connected to the fishing tackle of various kinds and is practically weedless.

Another object of the invention is to provide a snap of this character including a main shaft with an eye at the ends or an eye on one end and a hook at the other end thereof and so adjusted to cause the said main shaft to resist the pull between the line and tackle.

Other objects will appear as the disclosure progresses. The drawings are merely to indicate a possible embodiment of the invention. It is obvious that the actual needs of manufacture may necessitate certain mechanical changes. It is therefore not intended to limit the invention to the embodiment illustrated but rather to define such limits in the appended claims. For a more general understanding of the invention attention is called to the drawings. In these drawings like reference characters denote like parts throughout the specification.

In the accompanying drawings illustrating my invention:

Figure 1 is an elevational view of a fishing tackle showing the snap attached thereto.

Figure 2 is a view of the snap with a sinker attached to the main shaft.

Figure 3 is a similar view as Figure 2 but without the sinker.

Figures 4, 5 and 6 are modified forms of the snap.

Figure 7 is a side view of the snap shown in Figure 6.

Figure 8 is a similar view as Figure 6 but showing the snap in an open position.

Referring to the drawings in detail numeral 1 designates the fish hook attached to a link 2. In the middle of the link is formed an eye 3 to which is attached the lure 4. To the opposite end of the link is attached a swivel 5. Hooked to the other end of the swivel is a snap 6 to which is attached the line 7.

The snap is formed of a single strand of resilient wire and includes a main shaft 8. Attached to the main shaft is a sinker 9 preferably made of lead. The top end of the shaft is sharply bent downwardly as at 10 forming a triangular shaped eye 11 and extending from said triangular shaped eye is a link 12. The bottom end of the main shaft is sharply bent up as at 13 and formed into a triangular shaped eye 14 similar to the eye 11 at the top. Continuing from the eye 14 and sloping outwardly is a resilient member 15 having a hook 16 at the end which engages with the shank 12 and main shaft 8 just below the triangular shaped eye 11.

The sharp bends 10 and 13 of the triangular shaped eye are so positioned that a line 7 drawn vertically as shown in the figures will pass through the apex of said bends. The reason for this novel construction is as follows: It will be apparent that the triangular shaped eyes 10 and 13 with the apices opposite each other will cause the elements tied or fastened to the said eyes to slide to the main shaft and thus transmit practically the entire pull to said shaft and thereby relieving the other associated parts of any strain so they will function in their normal manner. Any of the slight strain which may pass over to the eyes will only cause the snap to be hooked more firmly together for the reason that there will be a tendency of the shank 12 to move to the right and the hook 16 to the left. The result will be an opposite pull and a stronger grip between the hook and shank. It will thus be seen that by the novel arrangement and shape of the snap any of the strain which may not be taken up by the main shaft will be used to hook the snap more firmly together.

In Figure 4 is shown a modified form of the snap. The construction is mainly the same as the snap shown in Figures 2 and 3 with the exception of the resilient member 18 which is formed of two sections 19 and 20 bent as at 21.

The modified form of the snap shown in Figure 5 is the same as that illustrated in Figures 2 and 3 excepting that circular eyes 22 and 23 are used at the extremities of the main shaft.

In the modified form of the invention shown in Figures 6, 7 and 8, numeral 8 designates the main shaft, 11 the triangular shaped eye at the top formed from bending the wire downwardly as at 10, and 18 the resilient member. The resilient member is sharply bent up as at 13 from the main shaft and formed of two sections 19 and 20 having a bend 21 in the center.

Extending downward from the eye 11 at the top is a shank 24 having a hook 25 which loops over the main shaft 8 and the top end of the resilient member 18. As noted in Figure 7 the bend 26 at the place where the shank 24 ends and the hook 25 begins, projects slightly to the left thus forming a lock and prevents the resilient member from accidently being disengaged from the hook. The end 27 of the hook is bent downwardly so as to cause the weeds in the water to slide off instead of catching on it.

Having thus described my invention, I claim:—

1. In a device of the class described, a snap made from one piece of material, said snap comprising a main shaft, the ends of said shaft sharply bent in the opposite direction to each other, the upper part of the bend formed into a triangular shaped eye with the apex at the top, the end of said eye formed into a shank running parallel to said main shaft, the bottom of said main shaft formed into a triangular shaped eye with the apex at the extreme end, a resilient member continuing from said second mentioned triangular shaped eye and sloping outwardly of said main shaft, the upper end of said resilient member being sharply bent and provided with a hook to engage with said shank and main shaft, said apices of the triangular shaped eye being in direct line with each other.

2. In a device of the class described, a snap comprising a main shaft, the ends of said shaft bent in the opposite direction to each other, the upper part of the bend formed into a triangular shaped eye with the apex at the top, the end of said eye formed into a shank running parallel to said main shaft, the bottom of said main shaft formed into a triangular shaped eye with the apex at the extreme end, a resilient member continuing from said second mentioned triangular shaped eye and sloping outwardly of said main shaft, the upper end of said resilient member being sharply bent and provided with a hook to engage with said shank and main shaft, said apices of the triangular shaped eyes being in direct line with each other.

3. In a snap of the class described made from one piece of material, said snap comprising a main shaft, the ends of said shaft bent in the opposite direction to each other and formed into eyes, the lower end of the upper eye formed into a shank running parallel with said main shaft, a resilient member continuing from the eye at the bottom of said main shaft and sloping outwardly of said main shaft, the upper end of said resilient member being sharply bent and provided with a hook to engage with said shank and main shaft, the center of said eyes being in direct line with each other.

4. In a device of the class described, a snap made from one piece of material, said snap comprising a main shaft, the lower end of said shaft sharply bent upwardly forming a resilient member, said resilient member formed of two sections with a bend in the middle, the upper end of said main shaft bent downwardly forming an eye, a shank extending downwardly of said eye, the end of the shank formed into a hook which loops around the main shaft and over the upper end of the said resilient member, the end of said shank adapted slightly to slope downwardly toward the bottom of said loop so as to form a lock for the end of said resilient member.

In testimony whereof I affix my signature.

JOHN F. GOSHORN.